United States Patent
Wang et al.

(10) Patent No.: US 12,287,645 B2
(45) Date of Patent: Apr. 29, 2025

(54) MULTI-ROTOR UNMANNED AERIAL VEHICLE AND CONTROL METHOD THEREOF, CONTROL APPARATUS AND COMPUTER-READABLE STORAGE MEDIUM

(71) Applicant: SZ DJI TECHNOLOGY CO., LTD., Shenzhen (CN)

(72) Inventors: Xiaoliang Wang, Shenzhen (CN); Zhimeng Shang, Shenzhen (CN); Ximin Lv, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 237 days.

(21) Appl. No.: 17/979,483

(22) Filed: Nov. 2, 2022

(65) Prior Publication Data
US 2023/0315124 A1    Oct. 5, 2023

Related U.S. Application Data

(63) Continuation of application No. PCT/CN2020/089021, filed on May 7, 2020.

(51) Int. Cl.
*G05D 1/08*  (2006.01)
*B64C 39/02*  (2023.01)
*B64U 10/14*  (2023.01)
*G05D 1/00*  (2006.01)

(52) U.S. Cl.
CPC .......... *G05D 1/0816* (2013.01); *B64C 39/024* (2013.01); *B64U 10/14* (2023.01); *G05D 1/101* (2013.01)

(58) Field of Classification Search
CPC ...... G05D 1/0816; G05D 1/101; B64U 10/14; B64C 39/024

USPC ............................................................ 701/3
See application file for complete search history.

(56) References Cited

U.S. PATENT DOCUMENTS

| | | |
|---|---|---|
| 2002/0104922 A1 | 8/2002 | Nakamura |
| 2005/0178879 A1 | 8/2005 | Mao |
| 2017/0211933 A1* | 7/2017 | Babel .................. G05D 1/0016 |
| 2018/0134378 A1* | 5/2018 | Oberndorfer ......... B64C 11/205 |
| 2020/0103922 A1 | 4/2020 | Nonami et al. |

(Continued)

FOREIGN PATENT DOCUMENTS

| | | |
|---|---|---|
| CN | 102126554 A | 7/2011 |
| CN | 103359283 A | 10/2013 |

(Continued)

OTHER PUBLICATIONS

English Translation for CN107226206A. (Year: 2024).*
International Search Report (Feb. 18, 2021).

*Primary Examiner* — Mahmoud S Ismail
(74) *Attorney, Agent, or Firm* — FIDELI LAW PLLC

(57) ABSTRACT

A multi-rotor UAV control method, a multi-rotor UAV, a control apparatus, and a non-volatile computer-readable storage medium are provided. The multi-rotor UAV control method includes: obtaining a power status of each rotor of the UAV; and when it is determined, based on the power status, that the power of any one of the rotors of the UAV fails, controlling the UAV to enter a balance mode. In the balance mode, the UAV rotates at an angular velocity greater than a first threshold, and a displacement of the UAV in the horizontal direction is less than a preset displacement amount.

20 Claims, 9 Drawing Sheets

---

Obtain a power status of each rotor of a UAV — 01

When it is determined, based on the power status, that the power of one of the rotors of the UAV fails, control the UAV to enter a balance mode — 02

(56) References Cited

U.S. PATENT DOCUMENTS

2022/0289376 A1* 9/2022 Hayakawa .............. B64C 13/18
2023/0315124 A1* 10/2023 Wang .................... B64C 39/024

FOREIGN PATENT DOCUMENTS

| CN | 103963963 | A |   | 8/2014  |          |           |
|----|-----------|---|---|---------|----------|-----------|
| CN | 107077142 | A |   | 8/2017  |          |           |
| CN | 107226206 | A | * | 10/2017 | ............ | B64C 27/12 |
| CN | 110531778 | A |   | 12/2019 |          |           |
| CN | 110888451 | A |   | 3/2020  |          |           |

* cited by examiner

MULTI-ROTOR UNMANNED AERIAL VEHICLE AND CONTROL METHOD THEREOF, CONTROL APPARATUS AND COMPUTER-READABLE STORAGE MEDIUM

RELATED APPLICATIONS

This application is a continuation application of PCT application No. PCT/CN2020/089021, filed on May 7, 2020, and the content of which is incorporated herein by reference in its entirety.

TECHNICAL FIELD

The present disclosure relates to the field of aircraft safety technologies, and in particular, to a multi-rotor unmanned aerial vehicle (UAV) control method, a multi-rotor UAV, a control apparatus, and a non-volatile computer-readable storage medium.

BACKGROUND

Multi-rotor UAVs have characteristics such as simple structure, low costs, and being easy to control, and thus have been widely used in education and scientific research, aerial photography, military reconnaissance, police security and other fields.

A multi-rotor UAV may include a plurality of motors and propellers. The motors drive the propellers to rotate to generate a lift force and reverse torque. The lift force and a control torque required for flight of the UAV may be generated through a series of control algorithms and distribution strategies, so as to control the position and attitude of the UAV. However, when the power of a rotor fails, that is, when a motor stops or blade ejection occurs, the UAV may crash immediately, causing safety problems.

BRIEF SUMMARY

Some exemplary embodiments of the present disclosure provides a multi-rotor UAV control method, a multi-rotor UAV, a control apparatus, and a non-volatile computer-readable storage medium.

A multi-rotor unmanned aerial vehicle (UAV) control method in some exemplary embodiments of the present disclosure includes: obtaining power statuses of rotors of a UAV; and controlling the UAV to enter a balance mode, upon determining, based on the power statuses, that a rotor of the UAV has a power failure, where in the balance mode, the UAV rotates at an angular velocity greater than a first threshold, and a displacement of the UAV in a horizontal direction is less than a preset displacement amount.

A multi-rotor unmanned aerial vehicle (UAV) in some exemplary embodiments of the present disclosure includes: a body; a plurality of rotors disposed on the body; and one or more controllers disposed on the body, where the one or more of the controllers are configured to: obtain power statuses of rotors of a UAV, and control the UAV to enter a balance mode, upon determining, based on the power statuses, that a rotor of the UAV has a power failure, where in the balance mode, the UAV rotates at an angular velocity greater than a first threshold, and a displacement of the UAV in a horizontal direction is less than a preset displacement amount.

A control apparatus for a multi-rotor unmanned aerial vehicle (UAV) in some exemplary embodiments of the present disclosure includes: one or more controllers, configured to: obtain power statuses of rotors of a UAV, and control the UAV to enter a balance mode, upon determining, based on the power statuses, that a rotor of the UAV has a power failure, where in the balance mode, the UAV rotates at an angular velocity greater than a first threshold, and a displacement of the UAV in a horizontal direction is less than a preset displacement amount.

According to the multi-rotor UAV control method, the multi-rotor UAV, the control apparatus, and the non-volatile computer-readable storage medium in some exemplary embodiments of the present disclosure, when the power of any rotor of a UAV fails, for example, when a motor stops or blade ejection occurs for a propeller, the UAV may be controlled to rotate at an angular velocity greater than a first threshold, and a displacement of the UAV in the horizontal direction is less than a preset displacement amount. In this way, a user may take an effective safety measure before the UAV crashes, which can reduce a crash probability and ensure safety of the UAV. In this way, flight safety problems caused by power failure may be resolved.

Additional aspects and advantages of the present disclosure will be partially provided in the following description, and partially become evident based on the following description, or may be understood through the implementation of the present disclosure.

BRIEF DESCRIPTION OF THE DRAWINGS

The foregoing and/or additional aspects and advantages of the present disclosure may become apparent and readily understandable based on the description of some exemplary embodiments with reference to the accompanying drawings.

DETAILED DESCRIPTION

Figure 1:
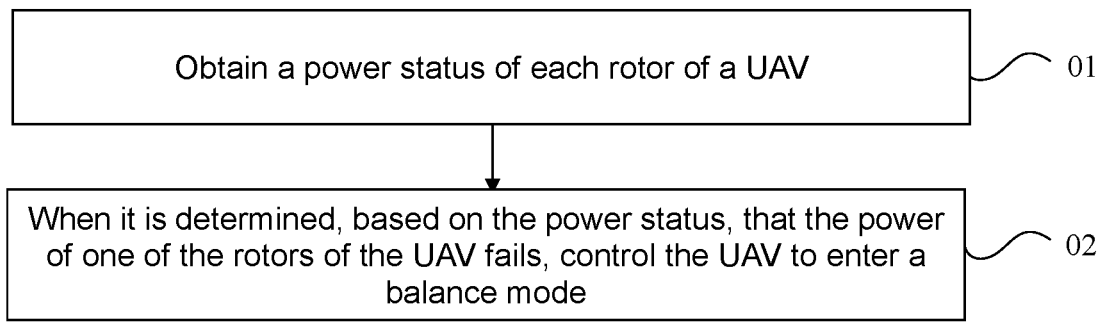
FIG. 1 is a schematic flowchart of a multi-rotor UAV control method according to some exemplary embodiments of the present disclosure.

Some exemplary embodiments of the present disclosure will be further described below with reference to the accompanying drawings. In the drawings, the same or similar numerals represent the same or similar elements or elements having the same or similar functions throughout the disclosure.

In addition, the embodiments of the present disclosure described below with reference to the accompanying drawings are exemplary, and are only used to explain some exemplary embodiments of the present disclosure but should not be construed as a limitation to the present disclosure.

Figure 2:
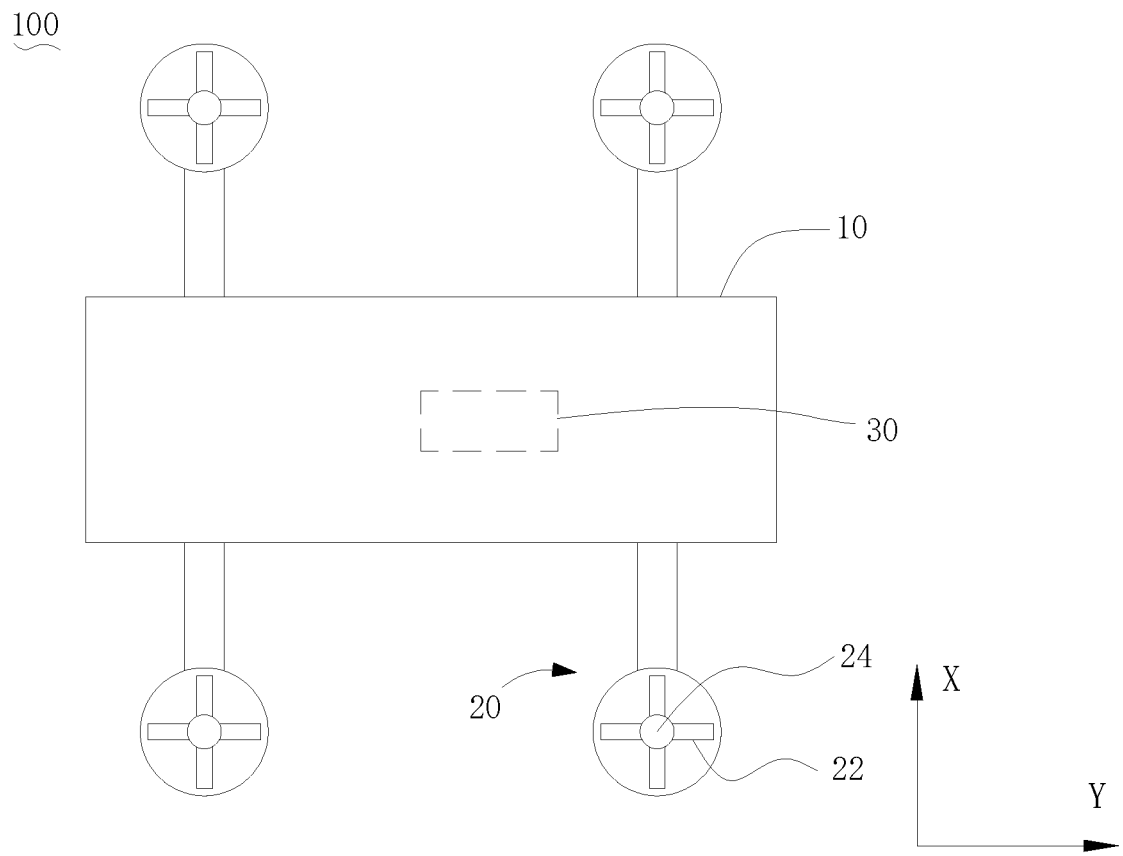
FIG. 2 is a schematic structural diagram of a multi-rotor UAV according to some exemplary embodiments of the present disclosure.

Referring to FIG. 1 and FIG. 2, some exemplary embodiments of the present disclosure provide a multi-rotor UAV control method. The control method may be applicable to a multi-rotor UAV 100, where the multi-rotor UAV 100 may include a body 10 and a plurality of rotors 20 disposed on the body 10, for example, two rotors, three rotors, four rotors, five rotors, six rotors, or more rotors that are disposed on the body 10. The control method may include the following steps:

Step 01: Obtain a power status of each rotor 20 of the UAV 100; and

Step 02: When it is determined, based on the power status, that the power of one of the rotors 20 of the UAV 100 fails, control the UAV 100 to enter a balance mode, where in the balance mode, the UAV 100 rotate at an angular velocity greater than a first threshold, and a displacement of the UAV 100 in the horizontal direction is less than a preset displacement amount.

Referring to FIG. 2, some exemplary embodiments of the present disclosure further provide a multi-rotor UAV 100. The multi-rotor UAV 100 may include a body 10, a plurality of rotors 20 disposed on the body 10, and one or more controllers 30 disposed on the body 10. The one or more controllers 30 may be configured to perform the method in steps 01 and 02, that is, the one or more controllers 30 may be configured to: obtain a power status of each rotor 20 of the UAV 100; and when it is determined, based on the power status, that power of one of the rotors 20 of the UAV 100 fails, control the UAV 100 to enter a balance mode, where in the balance mode, the UAV 100 rotates at an angular velocity greater than a first threshold, and a displacement of the UAV 100 in the horizontal direction is less than a preset displacement amount.

The number of rotors 20 may be two, three, four, five, six, or more, which is not limited herein. Each rotor 20 may include a propeller 22 and a motor 24 for driving the propeller 22 to rotate, in order to provide a lift force for the UAV 100. The power status of each rotor 20 of the UAV 100 may be represented by various parameters. In some exemplary embodiments, the power status of each rotor 20 may be represented by a parameter of the motor 24, such as voltage, current, or rotational speed. In one example, when the voltage of the motor 24 exceeds a preset voltage range, it indicates that the power of a corresponding rotor 20 fails. In another example, when the current of the motor 24 exceeds a preset current range, it indicates that the power of a corresponding rotor 20 fails. In yet another example, when the rotational speed of the motor 24 exceeds a preset rotational speed range, it indicates that the power of a corresponding rotor 20 fails. In some exemplary embodiments, the power status of each rotor 20 may be represented by a parameter of the propeller 22, such as a lift force thereof. In an example, when the lift force of the propeller 22 exceeds a preset pulling force range, it indicates that the power of a corresponding rotor 20 fails.

In addition, the UAV 100 rotating at an angular velocity greater than a first threshold refers to that the UAV 100 rotates around a Z axis of its own body. The first threshold generally takes a relatively large value, so that the angular velocity of the rotation of the UAV 100 may be relatively large, and thus the UAV 100 may maintain a balance even when any one of the rotors 20 fails. The displacement of the UAV 100 in the horizontal direction being less than a preset displacement amount refers to that a displacement of the UAV 100 on an XY plane in the world coordinate system (the Z axis (in a vertical direction) in the world coordinate system is perpendicular to the XY plane in the world coordinate system) is less than the preset displacement amount. The preset displacement amount generally takes a relatively small value, so that when any one of the rotors 20 fails, the UAV 100 does not float away, but retains in an initial position thereof when the power failure occurs.

According to the multi-rotor UAV control method and the multi-rotor UAV 100 in some exemplary embodiments of the present disclosure, when the power of one of the rotors 20 of the UAV 100 fails, for example, when a motor 24 stops or blade ejection occurs for a propeller 22, the UAV 100 may be controlled to rotate at an angular velocity greater than a first threshold, and a displacement of the UAV 100 in the horizontal direction is less than a preset displacement amount. In this way, a user is allowed to take an effective safety measure before the UAV crashes, which may reduce a crash probability and ensure safety of the UAV 100, and thus flight safety problems caused by power failure may be resolved.

Figure 3:
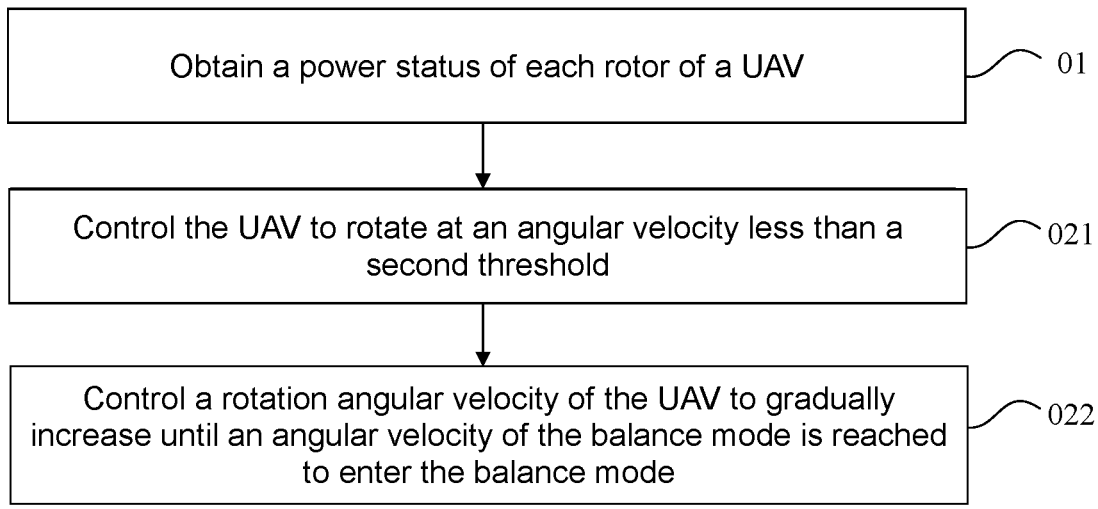
FIG. 3 is a schematic flowchart of a multi-rotor UAV control method according to some exemplary embodiments of the present disclosure.

Referring to FIG. 2 and FIG. 3, in some exemplary embodiments, the controlling of the UAV 100 to enter the balance mode in step 02 may include:

Step 021: Control the UAV 100 to rotate at an angular velocity less than a second threshold; and Step 022: Control the angular velocity at which the UAV 100 rotates to gradually increase until the angular velocity of the balance mode is reached, so as to enter the balance mode.

Correspondingly, the one or more controllers 30 in the multi-rotor UAV 100 may be configured to perform the method in steps 021 and 022, that is, the one or more controllers 30 may be configured to: control the UAV 100 to rotate at an angular velocity less than a second threshold; and control the angular velocity at which the UAV 100 rotates to gradually increase until the angular velocity of the balance mode is reached, so as to enter the balance mode.

The second threshold is less than the first threshold value. At a moment when power failure occurs on any rotor 20, the angular velocity of the rotation of the UAV 100 is often zero or very small. In order to reduce the disturbance caused by the power failure so as to enable the UAV 100 in a balanced state, the angular velocity of the rotation of the UAV 100 needs to be controlled to gradually increase until it is greater than the first threshold.

Figure 4:
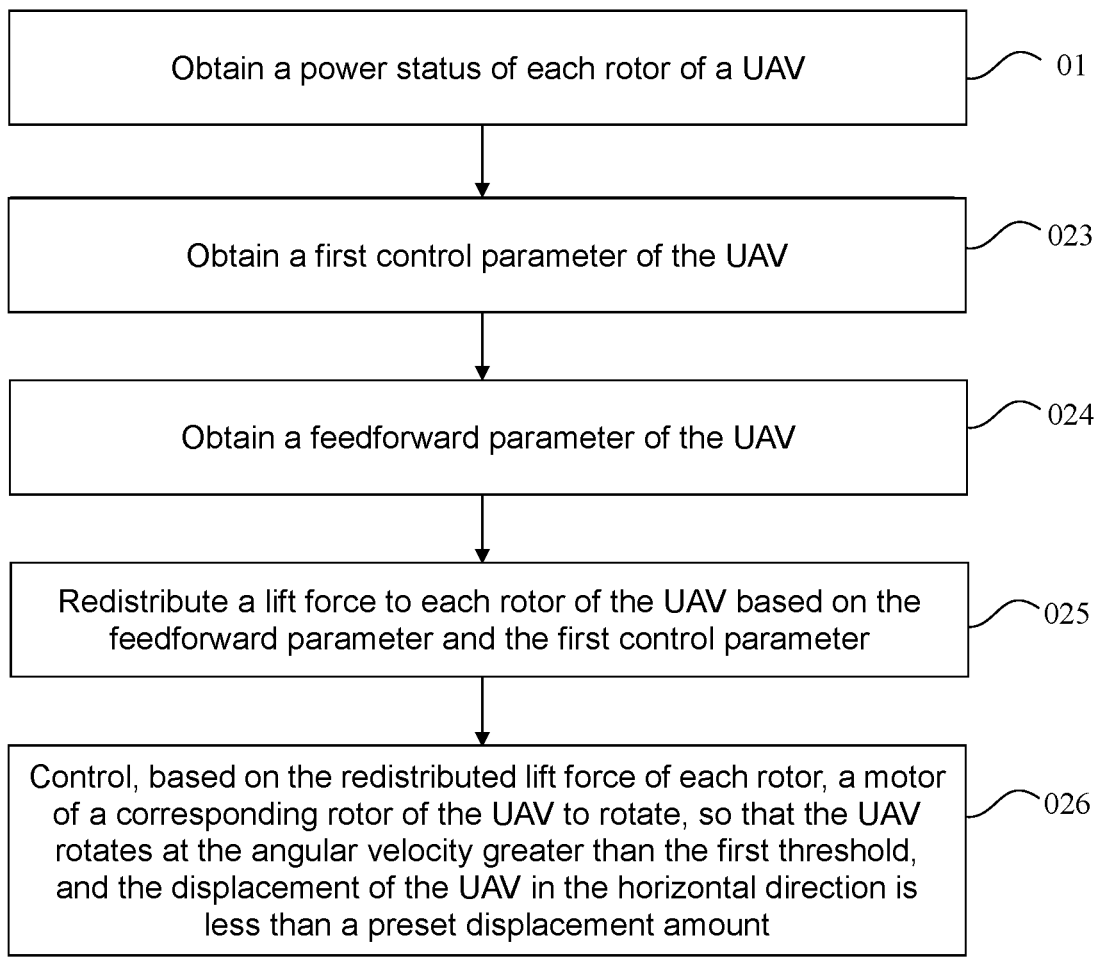
FIG. 4 is a schematic flowchart of a multi-rotor UAV control method according to some exemplary embodiments of the present disclosure.
Figure 5:
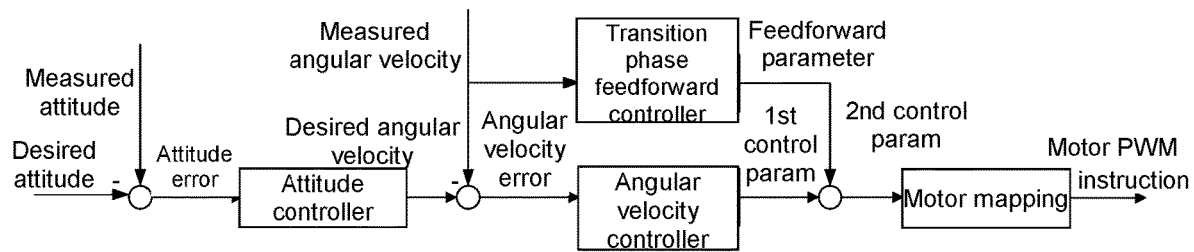
FIG. 5 is a schematic flowchart of a multi-rotor UAV control method according to some exemplary embodiments of the present disclosure.

Referring to FIG. 2, FIG. 4, and FIG. 5, in some exemplary embodiments, the controlling of the UAV 100 to enter the balance mode in step 02 may include:

Step 023: Obtain a first control parameter of the UAV 100;

Step 024: Obtain a feedforward parameter of the UAV 100;

Step 025: Redistribute a lift force to each rotor 20 of the UAV 100 based on the feedforward parameter and the first control parameter; and Step 026: Control, based on the redistributed lift force of each rotor 20, a motor 24 of the corresponding rotor 20 of the UAV 100 to rotate, so that the UAV 100 rotates at the angular velocity greater than the first threshold, and the displacement of the UAV 100 in the horizontal direction is less than preset displacement amount.

The one or more controllers 30 in the multi-rotor UAV 100 may be configured to perform the method in steps 023, 024, 025, and 026, that is, the one or more controllers 30 may be configured to: obtain a first control parameter of the UAV 100; obtain a feedforward parameter of the UAV 100; redistribute a lift force to each rotor 20 of the UAV 100 based on the feedforward parameter and the first control parameter; and control, based on the redistributed lift force of each rotor 20, a motor 24 of the corresponding rotor 20 of the UAV 100 to rotate, so that the UAV 100 rotates at the angular velocity greater than the first threshold, and the displacement of the UAV 100 in the horizontal direction is less than preset displacement amount.

Figure 6:
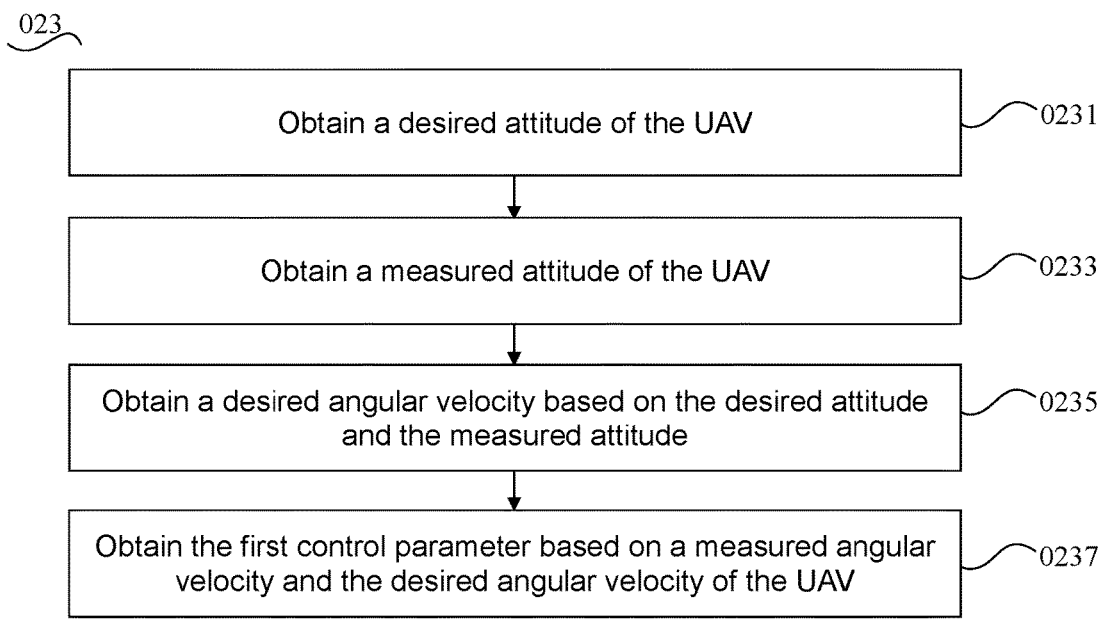
FIG. 6 is a schematic flowchart of a multi-rotor UAV control method according to some exemplary embodiments of the present disclosure.

Specifically, the first control parameter may be $F_{alloc}=(M_x, M_y, M_z, T_{all})^T$, which includes a first control torque and a first total control lift force of the UAV 100 before a rotor 20 fails. The first control torque may include three-axis control torques of the UAV 100 in a body coordinate system, which are respectively an X-axis control torque $M_x$, a Y-axis control torque $M_y$, and a Z-axis control torque $M_z$ in the body coordinate system; and the first total control lift force is $T_{all}$. Referring to FIG. 2, FIG. 5, and FIG. 6, in some exemplary embodiments, the obtaining of the first control parameter of the UAV 100 in step 023 may include:

Step 0231: Obtain a desired attitude of the UAV 100;

Step 0233: Obtain a measured attitude of the UAV 100;

Step 0235: Obtain a desired angular velocity based on the desired attitude and the measured attitude; and Step 0237: Obtain the first control parameter based on a measured angular velocity and the desired angular velocity of the UAV 100.

Correspondingly, the one or more controllers 30 of the multi-rotor UAV 100 may be configured to perform the method in steps 0231, 0233, 0235, and 0237, that is, the one or more controllers 30 may be configured to: obtain a desired attitude of the UAV 100; obtain a measured attitude of the UAV 100; obtain a desired angular velocity based on the desired attitude and the measured attitude; and obtain the first control parameter based on a measured angular velocity and the desired angular velocity of the UAV 100. The desired attitude may be transmitted by a remote controller to a communications unit of the UAV 100, and read from the communications unit by the one or more controllers 30. The measured attitude may be detected in real time by one or more sensors of the UAV 100, such as an inertial measurement unit, and then read from the sensor(s) by the one or more controllers 30. Referring to FIG. 5, in one example, the one or more controllers 30 may include an attitude controller and an angular velocity controller. The attitude controller may be configured to perform the method in step 0235, that is, the attitude controller may be configured to obtain a desired angular velocity based on the desired attitude and the measured attitude. The angular velocity controller may be configured to perform the method in step 0237, that is, the angular velocity controller may be configured to obtain a first control parameter based on the measured angular velocity and the desired angular velocity of the UAV 100.

Figure 7:
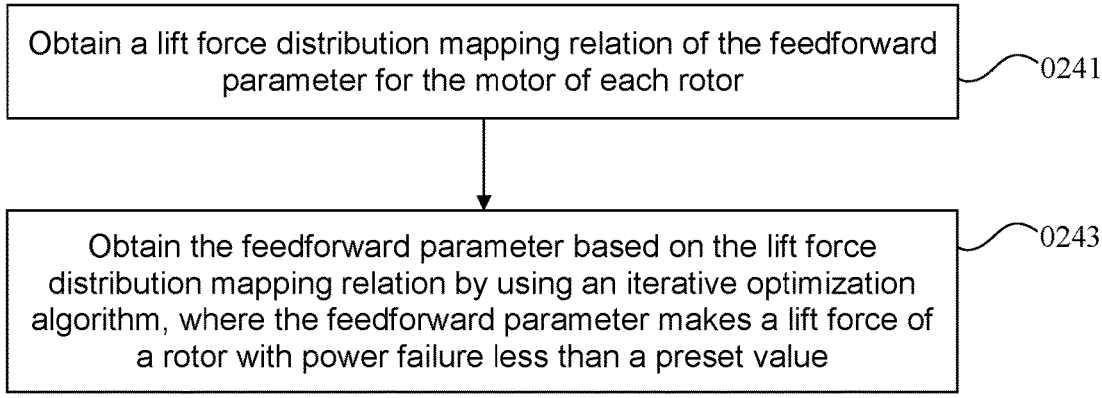
FIG. 7 is a schematic flowchart of a multi-rotor UAV control method according to some exemplary embodiments of the present disclosure.

The feedforward parameter may be $F_{fwd}=(M_{fx}, M_{fy}, M_{fz}, T_f)^T$, which includes a feedforward torque and a feedforward total lift force of the UAV 100 that are obtained after a rotor 20 fails. The feedforward torque may include three-axis feedforward torques of the UAV 100 in a body coordinate system, which are respectively an X-axis feedforward torque $M_{fx}$, a Y-axis feedforward torque $M_{fy}$, and a Z-axis feedforward torque $M_{fz}$ in the body coordinate system; and the feedforward total lift force is Tr. Referring to FIG. 2, FIG. 5, and FIG. 7, in some exemplary embodiments, the obtaining of the feedforward parameter of the UAV 100 in step 024 may include:

Step 0241: Obtain a lift force distribution mapping relation of the feedforward parameter for the motor 24 of each rotor 20; and Step 0243: Obtain the feedforward parameter based on the lift force distribution mapping relation by using an iterative optimization algorithm, where the feedforward parameter makes a lift force of a rotor 20 with power failure less than a preset value.

Correspondingly, the one or more controllers 30 of the multi-rotor UAV 100 may be configured to perform the methods in steps 0241 and 0243, that is, the one or more controllers 30 may be configured to: obtain a lift force distribution mapping relation with respect to the feedforward parameter for the motor 24 of each rotor 20; and obtain the feedforward parameter based on the lift force distribution mapping relation by using an iterative optimization algorithm, where the feedforward parameter makes a lift force of a rotor 20 with power failure less than a preset value. Referring to FIG. 5, in one example, the one or more controllers 30 may include a transition phase feedforward controller. The transition phase feedforward controller may be configured to perform the method in steps 0241 and 0243, that is, the transition phase feedforward controller may be configured to: obtain a lift force distribution mapping relation of the feedforward parameter for the motor 24 of each rotor 20; and obtain the feedforward parameter based on the lift force distribution mapping relation by using an iterative optimization algorithm, where the feedforward parameter makes a lift force of a rotor 20 with power failure less than a preset value.

The lift force distribution mapping relation may be represented by a function h with an unknown feedforward parameter as a variable: $T_m=h(M_{fx}, M_{fy}, M_{fz}, T_f)^T$, where $T_m \geq 0$, and $T_m$ is a lift force distributed to each motor 24. A process of obtaining the lift force distribution mapping relation is as follows:

The angular velocity of the rotation of the UAV 100 is zero or very small at a moment when power failure occurs on any rotor 20. Therefore, the UAV 100 needs to gain high-speed rotation quickly to provide sufficient gyroscopic torque to balance the attitude of the UAV 100. However, since the UAV 100 has a low rotation speed at the beginning and cannot rely on the gyroscopic torque to cancel the disturbance, it may be assumed that a feedforward parameter (unknown) is used to reduce the disturbance caused by power failure.

After the unknown feedforward parameter is applied to the UAV 100, a new control parameter may be expressed as follows with the function g:

$$F'_{alloc} = F_{alloc} + F_{fwd} = (M_x + M_{fx}, M_y + M_{fy}, M_z + M_{fz}, T_{all} + T_f)$$
$$T = g(M_{fx}, M_{fy}, M_{fz}, T_f)^T$$

The lift force distributed to each motor is as follows:

$$T_m = M_{alloc} F'_{alloc} = M_{alloc} g(M_{fx}, M_{fy}, M_{fz}, T_f)^T = h(M_{fx}, M_{fy}, M_{fz}, T_f)^T,$$

where $M_{alloc}$ is a preset distribution matrix, and is a known factor.

$T_m = (T_1, T_2, \ldots T_i)^T$, where i is a total number of rotors 20, as long as the lift force Ti of the rotor 20 with power failure is as small as possible, for example, less than a preset value. Generally, values of the X-axis feedforward torque $M_{fx}$, the Y-axis feedforward torque $M_{fy}$, and the Z-axis feedforward torque $M_{fz}$ are all in a range of (−100, 100), and a value of the feedforward total lift force $T_f$ is in a range of (0, 100). Therefore, a specific step of the obtaining of the feedforward parameter based on the lift force distribution mapping relation by using the iterative optimization algorithm may be as follows:

Respective initial values of the X-axis feedforward torque $M_{fx}$, the Y-axis feedforward torque $M_{fy}$, the Z-axis feedforward torque $M_{fz}$, the feedforward total lift force $T_f$ may be selected to be substituted into the lift force distribution mapping relation to obtain a lift force Ti1 of the rotor 20 with power failure. If the value of Ti1 is greater than the preset value, an iterative value may be added to the respective initial values of $M_{fx}$, $M_{fy}$, $M_{fz}$, and $T_f$, and then the obtained values are substituted into the lift force distribution mapping relation, so as to obtain a lift force Ti2 of the rotor 20 with power failure. The process is repeated until the value of Tin is less than the preset value (n is the number of times that values are substituted into the mapping relation). In this case, a torque $M_{lost}$ lost by the UAV 100 due to power failure of a rotor 20 may be eliminated. Values of $M_{fx}$, $M_{fy}$, $M_{fz}$, and $T_f$ are the feedforward parameters in step 024, and thus the feedforward parameters are solved.

Figure 8:
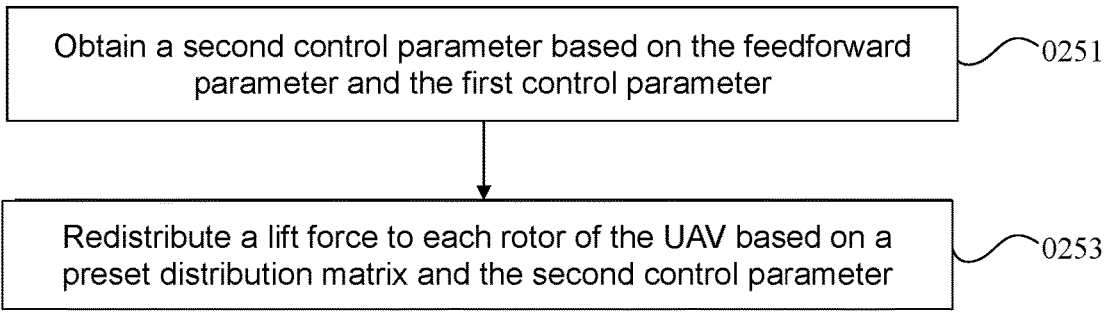
FIG. 8 is a schematic flowchart of a multi-rotor UAV control method according to some exemplary embodiments of the present disclosure.

Referring to FIG. 2, FIG. 5, and FIG. 8, in some exemplary embodiments, the redistributing of the lift force to each rotor 20 of the UAV 100 based on the feedforward parameter and the first control parameter in step 025 may include:

Step 0251: Obtain a second control parameter based on the feedforward parameter and the first control parameter; and Step 0253: Redistribute a lift force to each rotor 20 of the UAV 100 based on a preset distribution matrix and the second control parameter.

Correspondingly, the one or more controllers 30 of the multi-rotor UAV 100 may be configured to perform the methods in steps 0251 and 0253, that is, the one or more controllers 30 may be configured to: obtain a second control parameter based on the feedforward parameter and the first control parameter; and redistribute a lift force to each rotor 20 of the UAV 100 based on a preset distribution matrix and the second control parameter.

The first control parameter is $F_{alloc} = (M_x, M_y, M_z, T_{all})^T$, the feedforward parameter is $F_{fwd} = (M_{fx}, M_{fy}, M_{fz}, T_f)^T$, and the second control parameter is $F'_{alloc} = F_{alloc} + F_{fwd}$, which includes a second control torque and a second total control lift force of the UAV that are obtained after a rotor fails. The lift force is redistributed to each rotor 20 of the UAV 100 based on the preset distribution matrix and the second control parameter, that is, $T_m = M_{alloc} F'_{alloc}$, same as above, $M_{alloc}$ is the preset distribution matrix, which is a known factor. After the lift force is redistributed, the lift force of the rotor 20 whose power has disappeared is minimized, disturbance may be reduced to a minimum, and the UAV 100 smoothly transits to a balance state.

According to the multi-rotor UAV control method and the multi-rotor UAV 100 in some exemplary embodiments of the present disclosure, disturbance caused by power failure may be minimized by designing a feedforward parameter $F_{fwd}$, so that the UAV 100 may smoothly transits to a balance state, to prevent the UAV 100 from crashing due to the power failure, and safety of the UAV 100 may be ensured.

Figure 9:
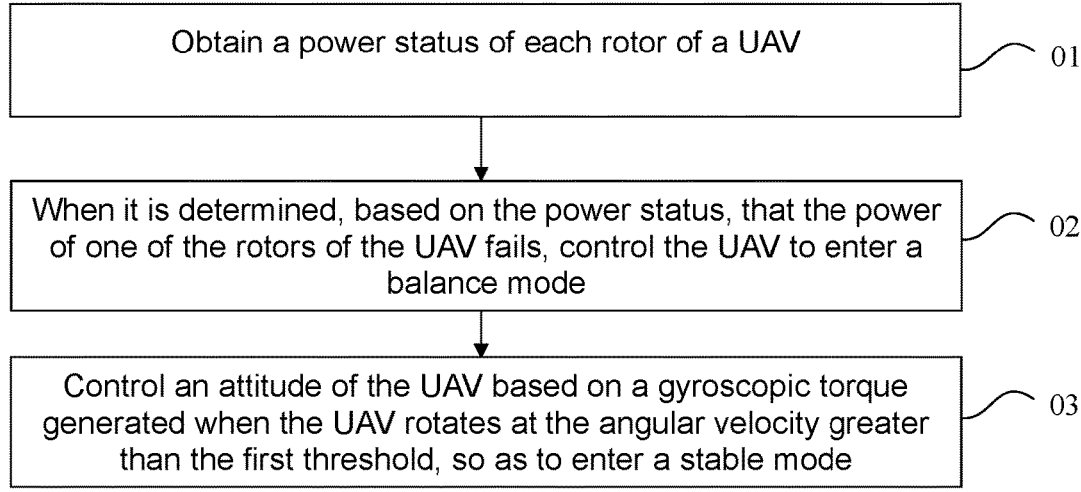
FIG. 9 is a schematic flowchart of a multi-rotor UAV control method according to some exemplary embodiments of the present disclosure.

Referring to FIG. 2 and FIG. 9 together, in some exemplary embodiments, the control method may further include:

Step 03: Control an attitude of the UAV 100 based on a gyroscopic torque generated when the UAV 100 rotates at the angular velocity greater than the first threshold, so as to enter a stable mode. In the stable mode, the UAV 100 may keep rotating at the angular velocity greater than the first threshold, and the UAV 100 is capable of performing a corresponding operation according to an instruction.

Correspondingly, the one or more controllers 30 in the multi-rotor UAV 100 may be configured to perform the method in step 03, that is, the one or more controllers 30 may be configured to: control an attitude of the UAV 100 based on a gyroscopic torque generated when the UAV 100 rotates at the angular velocity greater than the first threshold, so as to enter a stable mode. In the stable mode, the UAV 100 may keep rotating at the angular velocity greater than the first threshold, and the UAV 100 is capable of performing a corresponding operation according to an instruction.

In an example, the instruction may include a returning instruction. The UAV 100 being capable of performing a corresponding operation according to an instruction may include: the UAV 100 returning according to the returning instruction.

Correspondingly, the one or more controllers 30 may be configured to control the UAV 100 to return according to the returning instruction.

In an example, the instruction may include a hovering instruction. The UAV 100 being capable of performing a corresponding operation according to an instruction may include: the UAV 100 hovering according to the hovering instruction.

Correspondingly, the one or more controllers 30 may be configured to control the UAV 100 to hover according to the hovering instruction.

In an example, the instruction may include a landing instruction. The UAV 100 being capable of performing the corresponding operation according to the instruction may include: the UAV 100 landing according to the landing instruction.

Correspondingly, the one or more controllers 30 may be configured to control the UAV 100 to land according to the landing instruction.

In an example, the instruction may include a flight control instruction, and the flight control instruction includes a flight direction and/or a flight speed. The UAV 100 being capable of performing the corresponding operation according to the instruction may include: the UAV 100 flying according to the flight control instruction.

Correspondingly, the one or more controllers 30 may be configured to control the UAV 100 to fly according to the flight control instruction.

After the UAV 100 enters the balance state of high-speed rotation, although when the power of a rotor 20 fails, the control parameters (including a control torque and a total control lift force) generated by a motor 24 corresponding to the rotor 20 become insufficient, the gyroscopic torque generated by the high-speed rotation participates in attitude control of the UAV 100, so that the UAV 100 may enter a stable mode, and may respond to a user instruction and perform a corresponding operation. Thus, a user is allowed to effectively select a strategy that is beneficial to control of the UAV based on a current situation when power failure occurs on the UAV 100.

Therefore, a crash probability of the UAV 100 caused by the power failure may be greatly reduced, safety of the UAV 100 is ensured, and flight stability of the UAV 100 with power failure may also be improved.

Figure 10:
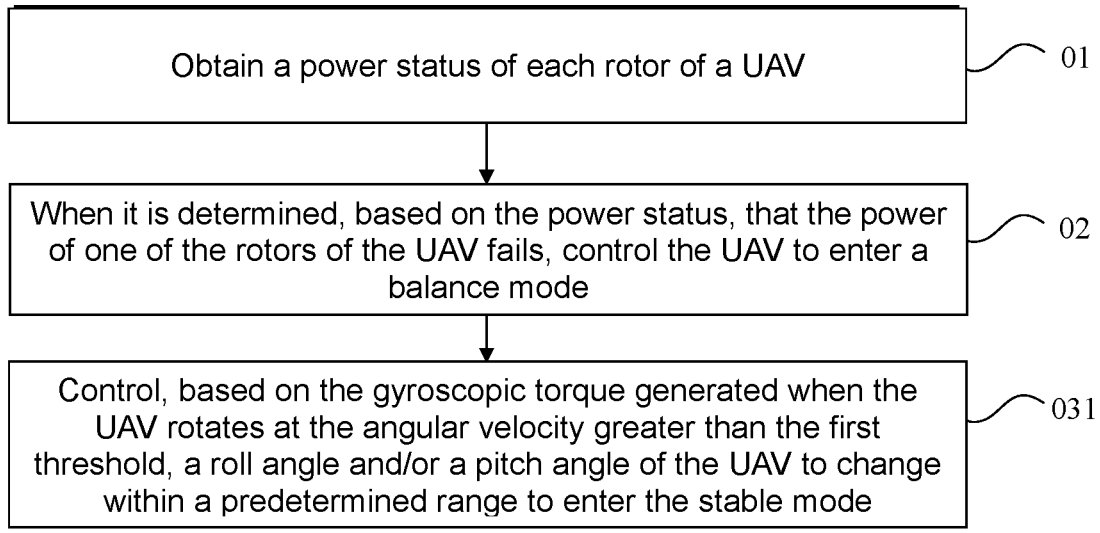
FIG. 10 is a schematic flowchart of a multi-rotor UAV control method according to some exemplary embodiments of the present disclosure.

Referring to FIG. 2 and FIG. 10 together, in some exemplary embodiments, in step 03, the controlling of the attitude of the UAV 100 based on the gyroscopic torque generated when the UAV 100 rotates at the angular velocity greater than the first threshold to enter a stable mode may include:

Step 031: Control, based on the gyroscopic torque generated when the UAV 100 rotates at the angular velocity greater than the first threshold, a roll angle and/or a pitch angle of the UAV 100 to change within a predetermined range to enter the stable mode.

Correspondingly, the one or more controllers 30 in the multi-rotor UAV 100 may be configured to perform the method in step 031, that is, the one or more controllers 30 may be configured to: control, based on the gyroscopic torque generated when the UAV 100 rotates at the angular velocity greater than the first threshold, a roll angle and/or a pitch angle of the UAV 100 to change within a predetermined range to enter the stable mode.

The UAV 100 may generate a great disturbance due to the power failure of a rotor 20. Although the disturbance may be reduced to a minimum in the balance mode, the disturbance may still exist. According to some exemplary embodiments, a gyroscopic torque generated by the high-speed rotation may be used in attitude control of the UAV 100, so that a roll angle and/or a pitch angle may be be changed within a predetermined range (typically a very small range), so as to further control the disturbance to be within a relatively small range. Therefore, the UAV 100 may be kept in a stable state, and safety of the UAV 100 may be ensured even if a power failure occurs on a rotor 20.

Figure 11:
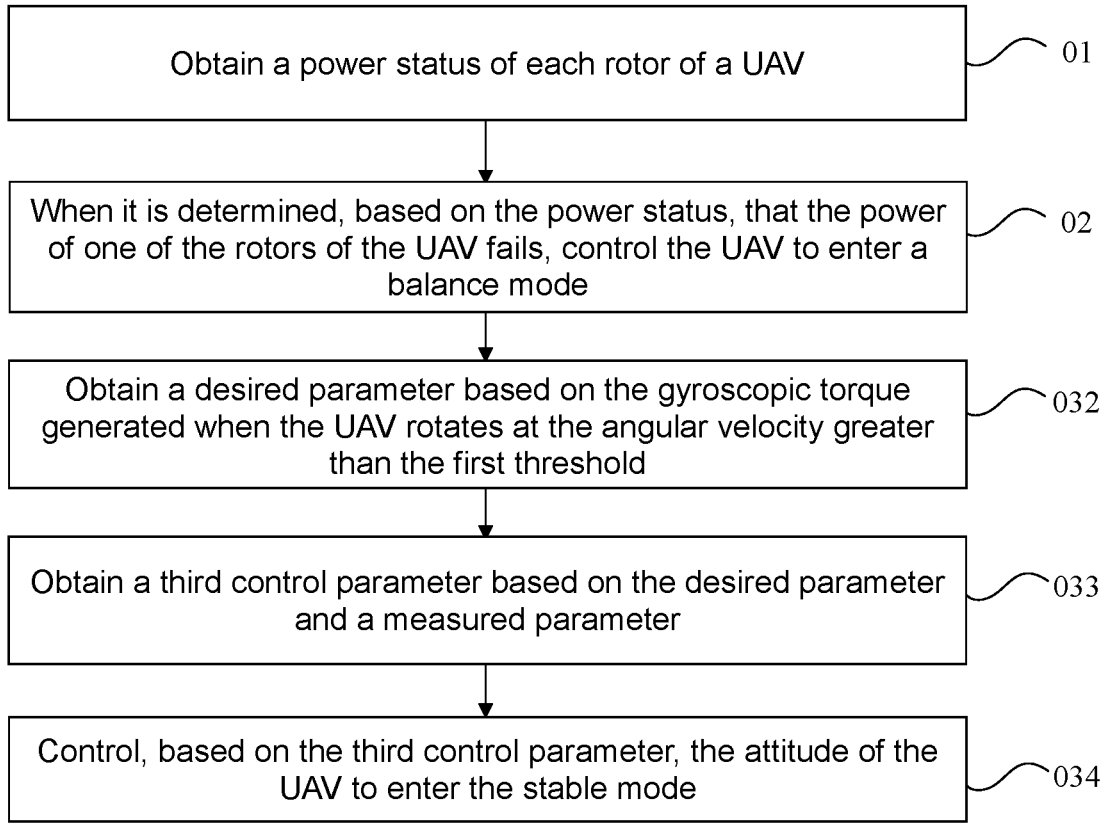
FIG. 11 is a schematic flowchart of a multi-rotor UAV control method according to some exemplary embodiments of the present disclosure.
Figure 12:
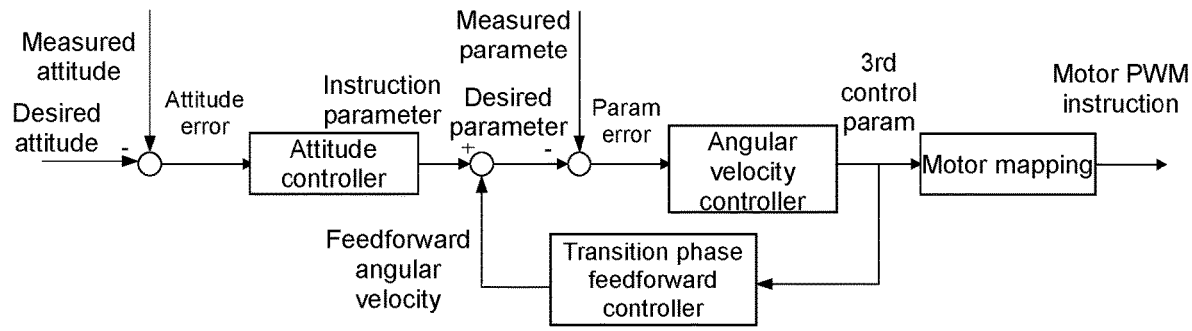
FIG. 12 is a schematic diagram of the principle of a multi-rotor UAV control method according to some exemplary embodiments of the present disclosure.

Referring to FIG. 2, FIG. 11, and FIG. 12 together, in some exemplary embodiments, in step 03, the controlling of the attitude of the UAV 100 based on the gyroscopic torque generated when the UAV 100 rotates at the angular velocity greater than the first threshold, so as to enter a stable mode may include:

Step 032: Obtain a desired parameter based on the gyroscopic torque generated when the UAV 100 rotates at the angular velocity greater than the first threshold;

Step 033: Obtain a third control parameter based on the desired parameter and a measured parameter; and Step 034: Control, based on the third control parameter, the attitude of the UAV 100 to enter the stable mode.

The one or more controllers 30 of the multi-rotor UAV 100 may be configured to perform the method in steps 032, 033, and 034, that is, the one or more controllers 30 may be configured to: obtain a desired parameter based on the gyroscopic torque generated when the UAV 100 rotates at the angular velocity greater than the first threshold; obtain a third control parameter based on the desired parameter and a measured parameter; and control, based on the third control parameter, the attitude of the UAV 100 to enter the stable mode.

Figure 13:
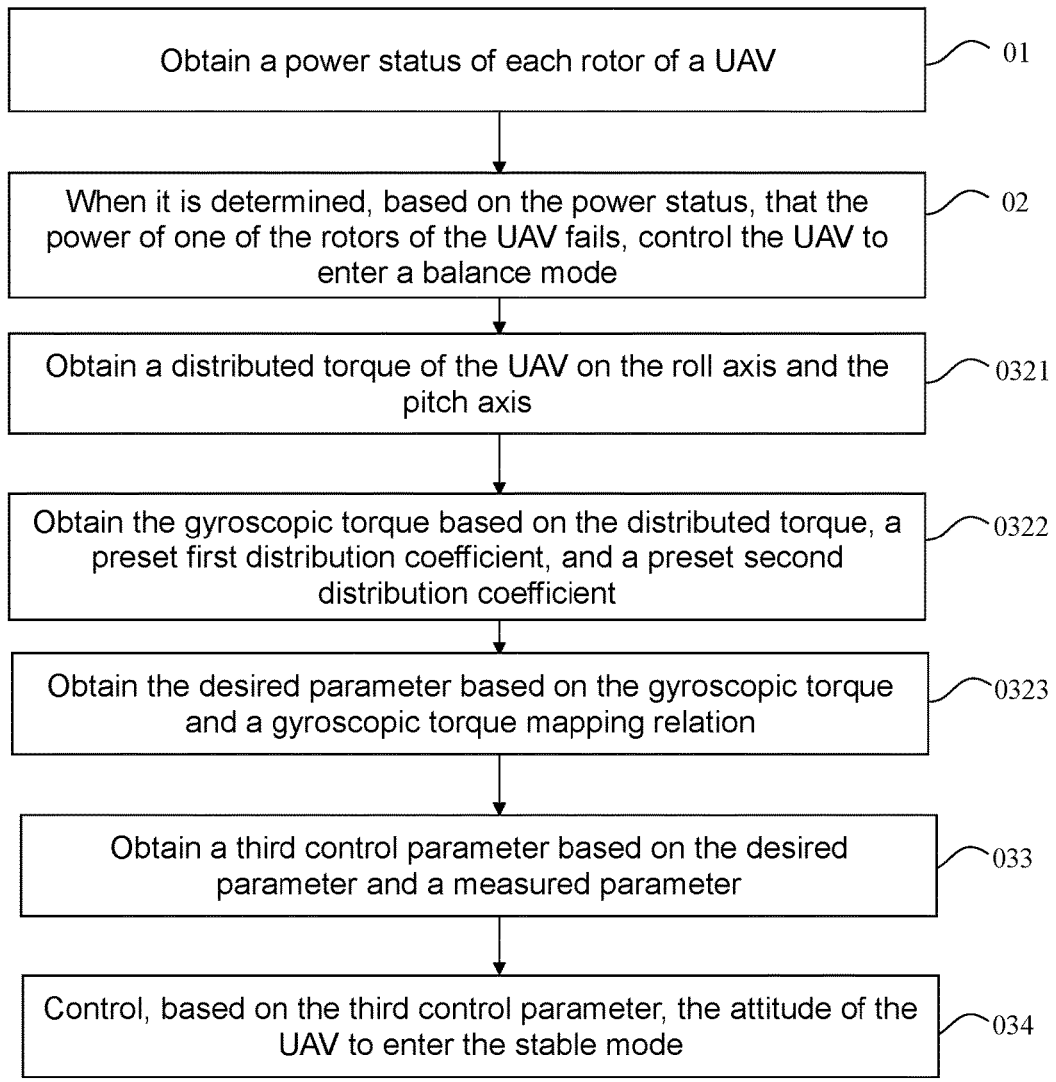
FIG. 13 is a schematic flowchart of a multi-rotor UAV control method according to some exemplary embodiments of the present disclosure.

Specifically, the desired parameter may include a desired angular velocity $P_{des}$ of a roll axis and a desired angular velocity $q_{des}$ of a pitch axis of the UAV 100. Referring to FIG. 2, FIG. 12, and FIG. 13 together, in some exemplary embodiments, the obtaining of the desired parameter based on the gyroscopic torque generated when the UAV 100 rotates at the angular velocity greater than the first threshold in step 032 may include:

Step 0321: Obtain a distributed torque of the UAV 100 on the roll axis and the pitch axis;

Step 0322: Obtain the gyroscopic torque based on the distributed torque, a preset first distribution coefficient, and a preset second distribution coefficient; and Step 0323: Obtain the desired parameter based on the gyroscopic torque and a gyroscopic torque mapping relation.

Correspondingly, the one or more controllers 30 in the multi-rotor UAV 100 may be configured to perform the method in steps 0321, 0322, and 0323, that is, the one or more controllers 30 may be configured to: obtain a distributed torque of the UAV 100 on the roll axis and the pitch axis; obtain the gyroscopic torque based on the distributed torque, a preset first distribution coefficient, and a preset second distribution coefficient; and obtain the desired parameter based on the gyroscopic torque and a gyroscopic torque mapping relation. In an example, the one or more controllers 30 may include an angular velocity controller. The angular velocity controller may be configured to perform the method in step 0321, that is, the angular velocity controller may be configured to obtain a distributed torque of the UAV 100 on the roll axis and the pitch axis. The distributed torque may be $F_{xy}=(M_x, M_y)^T$, which is a known factor output by the angular velocity controller. The distributed torque may include an X-axis control torque $M_x$ and a Y-axis control torque $M_y$ of the UAV 100 after the UAV 100 enters the balance mode.

If part of the distributed torque is provided by the gyroscopic torque, the gyroscopic torque is $M_{gyro}=(a_1 M_x, a_2 M_y)^T$, where $a_1$ is a first distribution coefficient, and $a_2$ is a second distribution coefficient. More specifically, in an example, the first distribution coefficient $a_1$ is greater than 0 and less than or equal to 1, for example, $a_1$ may be any value of 0.1, 0.2, 0.3, 0.4, 0.5, 0.6, 0.7, 0.8, 0.9 and 1.0, or any numerical value between any two values. In some exemplary embodiments, the first distribution coefficient $a_1$ may be greater than or equal to 0.2 and less than or equal to 0.5. In an example, the second distribution coefficient $a_2$ is greater than 0 and less than or equal to 1. For example, $a_2$ may be any value of 0.1, 0.2, 0.3, 0.4, 0.5, 0.6, 0.7, 0.8, 0.9 and 1.0, or any numerical value between any two values. In some exemplary embodiments, the second distribution coefficient $a_2$ may be greater than or equal to 0.2 and less than or equal to 0.5. In an example, the first distribution coefficient $a_1$ is greater than 0 and less than or equal to 1, and the second distribution coefficient $a_2$ is also greater than 0 and less than or equal to 1. In some exemplary embodiments, the first distribution coefficient $a_1$ may be the same as the second distribution coefficient $a_2$.

The gyroscopic torque mapping relation may be a gyroscopic torque formula, that is, $M_{gyro}=(-qr, pr, 0)^T I_z$, where p is an angular velocity of the roll axis (X axis) of the UAV 100, q is an angular velocity of the pitch axis (Y axis) of the UAV 100, r is an angular velocity of a yaw axis (Z axis) of the UAV 100, and $I_z$ is an inertia of the yaw axis of the UAV 100. According to the gyroscopic torque $M_{gyro}=(a_1M_x, a_2M_y)^T$ and the gyroscopic torque formula $M_{gyro}=(-qr,pr,0)^T I_z$, the desired parameter of the UAV 100 may be calculated, namely, the desired angular velocity $p_{des}$ of the roll axis and the desired angular velocity $q_{des}$ of the pitch axis of the UAV 100, $$(p_{des}, q_{des})^T = \left(\frac{-a_{1M_x}}{rI_z}, \frac{a_{2M_y}}{rI_z}\right)^T,$$

where r is a known factor detected by a sensor, and $I_z$ is also a known factor.

Referring to FIG. 12, in an example, the one or more controllers 30 may include an angular velocity controller. The angular velocity controller may be configured to perform the method in step 033, that is, the angular velocity controller may be configured to obtain a third control parameter based on the desired parameter and a measured parameter. The measured parameter may include a measured angular velocity of the roll axis and a measured angular velocity of the pitch axis of the UAV 100, both of which may be detected by a sensor(s). Parameter errors, namely, an angular velocity error of the roll axis and an angular velocity error of the pitch axis of the UAV 100 may be obtained based on the desired parameter and the measured parameters. The angular velocity controller then may obtain the third control parameter based on the parameter errors. In this case, the third control parameter may include: a third control torque and a third total control lift force of the UAV 100 that are obtained in the stable mode after a rotor 20 fails.

Still referring to FIG. 12, in some exemplary embodiments, the controlling of the attitude of the UAV 100 based on the third control parameter to enter the stable mode in step 034 may include:

Redistribute a lift force to each rotor 20 of the UAV 100 based on a preset distribution matrix and the third control parameter; and Control, based on the redistributed lift force of each rotor 20, a motor 24 of the corresponding rotor 20 of the UAV 100 to rotate, so that the attitude of the UAV 100 is in the stable mode.

For the step of redistributing of a lift force to each rotor 20 of the UAV 100, reference may be made to the method in step 0253. Details will not be described herein again.

In addition, it should be noted that: referring to FIG. 12, as mentioned above, the one or more controllers 30 may include an attitude controller. The attitude controller may be configured to obtain an instruction parameter based on the desired attitude and the measured attitude. The instruction parameter may include a desired angular velocity $p_{command}$ of the roll axis and a desired angular velocity $q_{command}$ of the pitch axis of the UAV 100. After the desired angular velocity $p_{des}$ of the roll axis and the desired angular velocity $q_{des}$ of the pitch axis of the UAV 100 are obtained, a feedforward angular velocity $p_{fwd}$ of the roll axis and a feedforward angular velocity $q_{fwd}$ of the pitch axis of the UAV 100 may be obtained, that is, $(p_{fwd}, q_{fwd})^T=(p_{des}-p_{command}, q_{des}-q_{command})^T$. The one or more controllers 30 may further include an angular velocity instruction feedforward compensation controller, and the angular velocity instruction feedforward compensation controller may output the feedforward angular velocity $P_{fwd}$ of the roll axis and the feedforward angular velocity $q_{fwd}$ of the pitch axis of the UAV 100.

Figure 14:
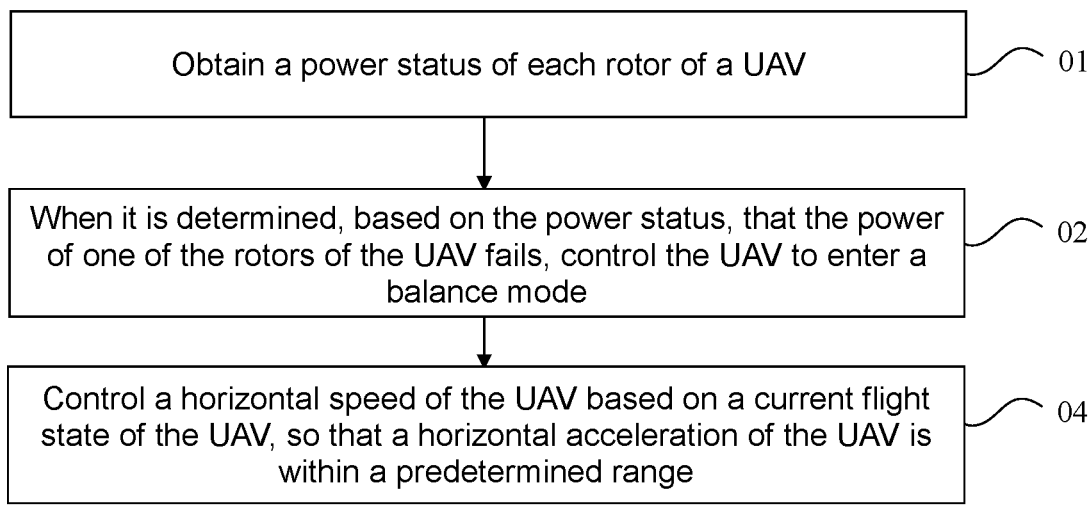
FIG. 14 is a schematic flowchart of a multi-rotor UAV control method according to some exemplary embodiments of the present disclosure.

Referring to FIG. 2 and FIG. 14 together, in some exemplary embodiments, the control method may further include:

Step 04: Control a horizontal speed of the UAV 100 based on a current flight state of the UAV 100, so that a horizontal acceleration of the UAV 100 may be within a predetermined range.

Correspondingly, the one or more controllers 30 in the multi-rotor UAV 100 may be configured to perform the method in step 04, that is, the one or more controllers 30 may be configured to: control a horizontal speed of the UAV 100 based on a current flight state of the UAV 100, so that a horizontal acceleration of the UAV 100 may be within a predetermined range.

Figure 15:
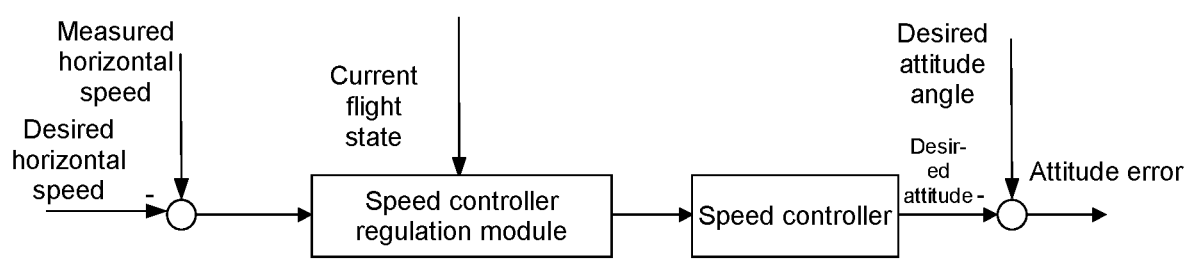
FIG. 15 is a schematic flowchart of a multi-rotor UAV control method according to some exemplary embodiments of the present disclosure.
Figure 16:
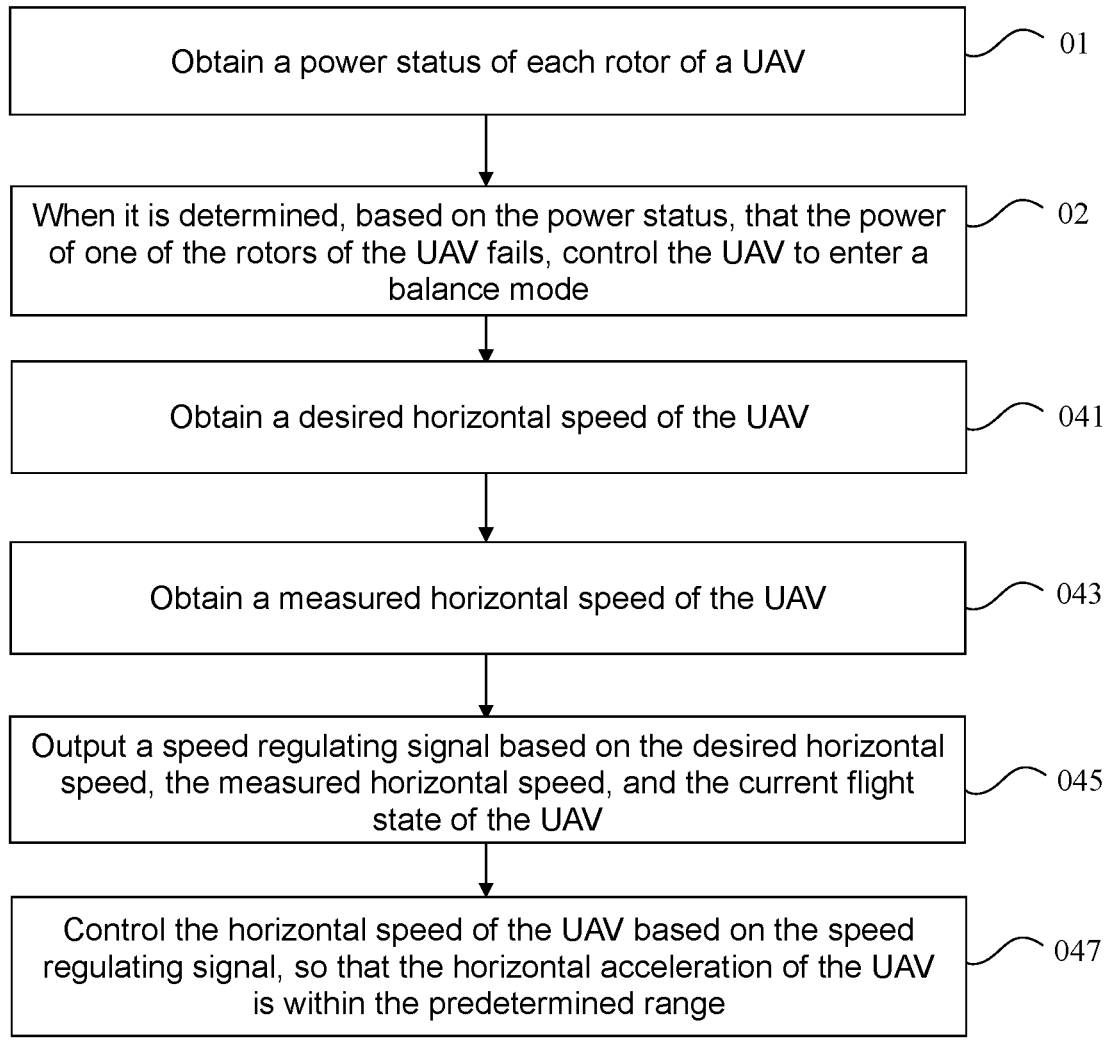
FIG. 16 is a schematic flowchart of a multi-rotor UAV control method according to some exemplary embodiments of the present disclosure.

Referring to FIG. 2, FIG. 15, and FIG. 16 together, in some exemplary embodiments, the controlling of the horizontal speed of the UAV 100 based on the current flight state of the UAV 100, so that the horizontal acceleration of the UAV 100 is within a predetermined range in step 04 may include:

Step 041: Obtain a desired horizontal speed of the UAV 100;

Step 043: Obtain a measured horizontal speed of the UAV 100;

Step 045: Output a speed regulating signal based on the desired horizontal speed, the measured horizontal speed, and the current flight state of the UAV 100; and Step 047: Control the horizontal speed of the UAV 100 based on the speed regulating signal, so that the horizontal acceleration of the UAV 100 is within the predetermined range.

Correspondingly, the one or more controllers 30 in the multi-rotor UAV 100 may be configured to perform the method in steps 041, 043, 045, and 047, that is, the one or more controllers 30 may be configured to: obtain a desired horizontal speed of the UAV 100; obtain a measured horizontal speed of the UAV 100; output a speed regulating signal based on the desired horizontal speed, the measured horizontal speed, and the current flight state of the UAV 100; and control the horizontal speed of the UAV 100 based on the speed regulating signal, so that the horizontal acceleration of the UAV 100 is within the predetermined range.

Referring to FIG. 15, in an example, the one or more controllers 30 may include a speed controller regulation module and a speed controller. The speed controller regulation module may be configured to perform the method in step 045, that is, the speed controller regulation module may be configured to output a speed regulating signal based on the desired horizontal speed, the measured horizontal speed, and the current flight state of the UAV 100. The speed controller may be configured to perform the method in step 047, that is, the speed controller may be configured to control the horizontal speed of the UAV 100 based on the speed regulating signal, so that the horizontal acceleration of the UAV 100 is within the predetermined range.

As mentioned above, in the multi-rotor UAV control method and the multi-rotor UAV 100 of the present disclosure, after the power of any one of the rotors 20 of the UAV 100 fails, the UAV 100 gradually enters a balance mode in which the UAV 100 performs high-speed rotation. In addition, an attitude control algorithm to which angular velocity instruction feedforward compensation is applied is used to control an attitude of the UAV 100, so that the UAV 100 enters a stable mode in which the UAV 100 has a stable attitude. In this case, the control of the heading of the UAV 100 is released to be in a follow-up state, that is, the controller 30 does not generate a heading control torque, and because the UAV 100 is in a special flight state, a +− speed controller of the UAV 100 regulates the speed in real time according to a current flight state, to prevent the attitude of the UAV 100 from being too large to be diverged, thereby further improving the stability of the UAV 100.

Figure 17:
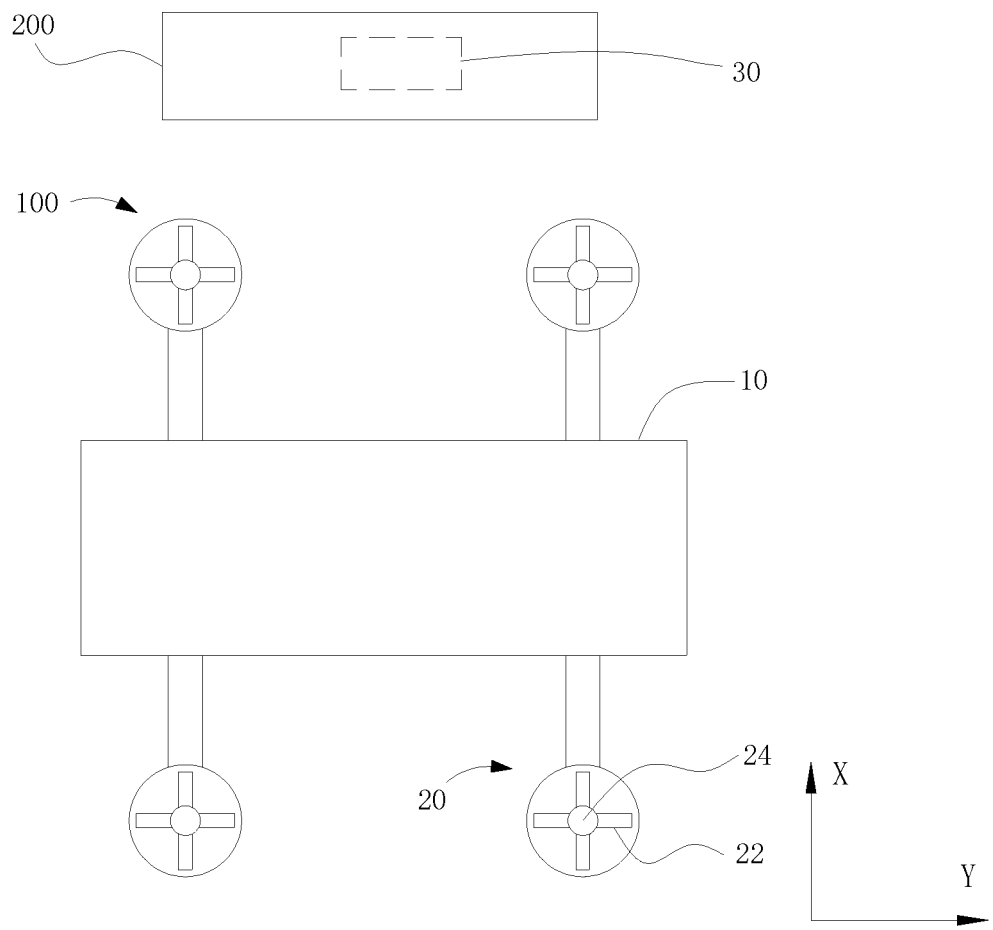
FIG. 17 is a schematic structural diagram of a control apparatus and a multi-rotor UAV according to some exemplary embodiments of the present disclosure.

Referring to FIG. 17, the present disclosure further provides a control apparatus 200, and the control apparatus 200 may be applied to a multi-rotor UAV 100. The multi-rotor UAV 100 may include a body 10, and a plurality of rotors 20 disposed on the body 10. The control apparatus 200 may include one or more controllers 30, and the one or more controllers 30 may be configured to perform the multi-rotor UAV control method in any one of the foregoing exemplary embodiments. The multi-rotor UAV control method may include the methods in steps 01, 02, 021, 022, 023, 024, 025, 026, 0231, 0233, 0235, 0237, 0241, 0243, 0251, 0253, 03, 031, 032, 033, The methods in 034, 0321, 0322, 0323, 04, 041, 043, 045, and 047, for example, the one or more controllers 30 may be configured to perform:

Step 01: Obtain a power status of each rotor 20 of the UAV 100; and

Step 02: when it is determined based on the power status that power of any one of the rotors 20 of the UAV 100 fails, control the UAV 100 to enter a balance mode, where in the balance mode, the UAV 100 rotates at an angular velocity greater than a first threshold, and a displacement of the UAV 100 in the horizontal direction is less than a preset displacement amount.

It should be noted that the control apparatus 200 may be independent of the UAV 100, or may be integrated with the UAV 100, and may be disposed inside or outside the body 10 of the UAV 100, which is not limited herein.

According to the control apparatus 200 of some exemplary embodiments of the present disclosure, when the power of any one of the rotors 20 of the UAV 100 fails, for example, when a motor 24 stops or a propeller 22 has blade ejection, one or more controllers 30 may control the UAV 100 to rotate at an angular velocity greater than a first threshold, and a displacement of the UAV 100 in the horizontal direction is less than a preset displacement amount. In this way, a user may take an effective safety measure before the UAV 100 crashes, which may reduce a crash probability of the UAV 100 and ensure safety of the UAV 100, and thus a flight safety problem caused by power failure may be resolved.

Figure 18:
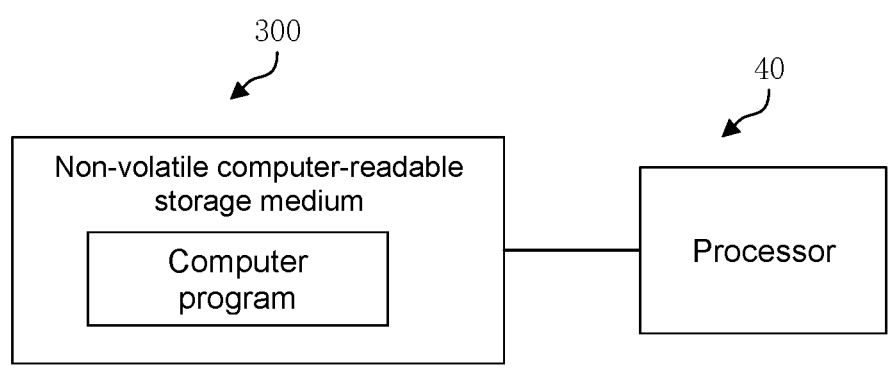
FIG. 18 is a schematic diagram of modules of a computer-readable storage medium according to some exemplary embodiments of the present disclosure.

Referring to FIG. 18, the present disclosure further provides a non-volatile computer-readable storage medium 300. The computer-readable storage medium 300 may store a computer program. When the computer program is executed by a processor 40, the multi-rotor UAV control method of any one of the foregoing exemplary embodiments may be implemented. The multi-rotor UAV control method may include the methods in steps 01, 02, 021, 022, 023, 024, 025, 026, 0231, 0233, 0235, 0237, 0241, 0243, 0251, 0253, 03, 031, 032, 033, 034, 0321, 0322, 0323, 04, 041, 043, 045, and 047, for example, the processor 40 may perform:

Step 01: Obtain a power status of each rotor 20 of the UAV 100; and

Step 02: when it is determined based on the power status that power of any one of the rotors 20 of the UAV 100 fails, control the UAV 100 to enter a balance mode, where in the balance mode, the UAV 100 rotates at an angular velocity greater than a first threshold, and a displacement of the UAV 100 in the horizontal direction is less than a preset displacement amount.

Based on the non-volatile computer-readable storage medium 300 of the embodiment of the present disclosure, when the power of any one of the rotors 20 of the UAV 100 fails, for example, when a motor 24 stops or a propeller 22 has blade ejection, the controller 40 may control the UAV 100 to rotate at an angular velocity greater than a first threshold, and a displacement of the UAV 100 in the horizontal direction may be less than a preset displacement amount. In this way, a user may take an effective safety measure before the UAV 100 crashes, which may reduce a crash probability of the UAV 100 and ensure safety of the UAV 100, and thus a flight safety problem caused by power failure may be resolved.

In the present disclosure, the descriptions with reference to the terms, such as "an embodiment", "some embodiments", "an example", "a specific example", or "some examples," refer to that the specific features, structures, materials, or characteristics described with reference to certain embodiment(s) or examples are included in at least one embodiment or example of the present disclosure. In this disclosure, the schematic representation of the above terms is not necessarily directed to the same embodiment or example. Moreover, the specific features, structures, materials, or characteristics described may be combined in a suitable manner in any one or more embodiments or examples. In addition, various embodiments or examples described in this disclosure, as well as features of various embodiments or examples, may be integrated or combined by those skilled in the art without any contradiction.

Moreover, the terms such as "first" and "second" are used only for the purpose of description and should not be construed as indicating or implying a relative importance, or implicitly indicating a quantity of indicated technical features. Therefore, features defined by "first" and "second" may explicitly or implicitly include at least one of the features. In the present disclosure, "a plurality of" means at least two, for example, two or three, unless otherwise explicitly and specifically limited.

Any process or method description in the flowchart or described in other manners herein may be understood as representing a module, segment, or part of code that includes one or more executable instructions for implementing steps of specific logical functions or steps of the process. In addition, the scope of some exemplary embodiments of the present disclosure may include additional implementations, which may not be in the order shown or discussed, including performing functions in a substantially simultaneous manner or in a reverse order according to the functions involved. This should be understood by a person skilled in the art to which some exemplary embodiments of the present disclosure belong.

The logic and/or steps represented in the flowchart or described in other manners herein, for example, may be considered as a sequenced list of executable instructions for implementing logical functions, and may be implemented in any computer-readable medium, for use by instruction execution systems, apparatuses, or devices (such as computer-based systems, systems including processors, or other systems that may obtain instructions from the instruction execution systems, apparatuses, or devices and execute the instructions), or used in combination with these instruction execution systems, apparatuses, or devices. For the purposes of this disclosure, a "computer-readable medium" may be any apparatus that may contain, store, communicate, propagate, or transmit a program for use by instruction execution systems, apparatuses, or devices or in combination with these instruction execution systems, apparatuses, or devices. More specific examples (a non-exhaustive list) of the computer-readable medium include the following: an electrical connection (electronic device) with one or more wiring, a portable computer disk cartridge (magnetic device), a random access memory (RAM), a read-only memory (ROM), an erasable and editable read-only memory (an EPROM or a flash memory), a fiber optic device, and a portable compact disk read-only memory (CDROM). In addition, the computer-readable medium may even be a paper or other suitable mediums on which the program may be printed, as the program may be obtained electronically, for example, by optically scanning the paper or other mediums, followed by editing, interpreting, or processing in other suitable manners if necessary. The program is then stored in a computer memory.

It should be understood that each part of the present disclosure may be implemented by hardware, software, firmware, or a combination thereof. In the foregoing exemplary embodiments, a plurality of steps or methods may be implemented by using software or firmware that is stored in a memory and that may be executed by a proper instruction execution system. For example, if implemented by using hardware, as in some exemplary embodiments, the plurality of steps or methods may be implemented by any one or a combination of the following technologies known in the art: a discrete logic circuit with a logic gate circuit for implementing a logic function on a data signal, an application-specific integrated circuit with a suitable combinational logic gate circuit, a programmable gate array (PGA), a field programmable gate array (FPGA), and the like.

A person of ordinary skill in the art may understand that all or some of the steps in the methods of the foregoing embodiments may be implemented by a program instructing relevant hardware. The program may be stored in a computer-readable storage medium. When the program is executed, one or a combination of the steps in the method embodiments may be performed.

In addition, function units in some exemplary embodiments of the present disclosure may be integrated into a processing module, or each of the units may exist alone physically, or two or more units may be integrated into one module. The foregoing integrated module may be implemented in a form of hardware, or may be implemented in a form of a functional module of software. The integrated module, if implemented in the form of a functional module of software and sold or used as an independent product, may be stored in a computer-readable storage medium.

The aforementioned storage medium may be a read-only memory, a magnetic disk, or an optical disc. Although some exemplary embodiments of the present disclosure have been shown and described above, it is understood that the foregoing embodiments are exemplary and should not be construed as limiting the present disclosure. A person of ordinary skill in the art may make changes, modifications, replacements, and variants on the foregoing exemplary embodiments within the scope of the present disclosure.

What is claimed is:

1. A multi-rotor unmanned aerial vehicle (UAV) control method, comprising:
obtaining power statuses of rotors of a UAV; and
controlling the UAV to enter a balance mode, upon determining, based on the power statuses, that a rotor of the UAV has a power failure, wherein
in the balance mode, the UAV rotates at an angular velocity greater than a first threshold, and a displacement of the UAV in a horizontal direction is less than a preset displacement amount, and the controlling of the UAV to enter the balance mode includes:
obtaining a first control parameter of the UAV,
obtaining a feedforward parameter of the UAV,
redistributing lift forces to the rotors of the UAV based on the feedforward parameter and the first control parameter, and
controlling, based on redistributed lift forces of the rotors, motors of the rotors of the UAV to rotate to enable the UAV to rotate at the angular velocity greater than the first threshold, and have the displacement in the horizontal direction less than the preset displacement amount.

2. The method according to claim 1, wherein the controlling of the UAV to enter the balance mode includes:
controlling the UAV to rotate at an angular velocity less than a second threshold; and
controlling the angular velocity at which the UAV rotates to gradually increase to reach a balance-mode angular velocity to enter the balance mode.

3. The method according to claim 1, wherein
the first control parameter includes a first control torque and a first total control lift force of the UAV preceding the power failure of the rotor; and
the feedforward parameter includes a feedforward torque and a feedforward total lift force of the UAV succeeding the power failure of the rotor.

4. The method according to claim 3, wherein the redistributing of the lift forces to the rotors of the UAV based on the feedforward parameter and the first control parameter includes:
obtaining, based on the feedforward parameter and the first control parameter, a second control parameter including a second control torque and a second total control lift force of the UAV succeeding the power failure of the rotor; and
redistributing the lift forces to the rotors of the UAV based on a preset distribution matrix and the second control parameter.

5. The method according to claim 3, wherein the obtaining of the feedforward parameter of the UAV includes:
obtaining a lift force distribution mapping relation of the feedforward parameter for the motors of the rotors; and
obtaining, based on the lift force distribution mapping relation, the feedforward parameter by using an iterative optimization algorithm, to make a lift force of the rotor having the power failure less than a preset value.

6. The method according to claim 3, wherein the obtaining of the first control parameter of the UAV includes:
obtaining a desired attitude of the UAV;
obtaining a measured attitude of the UAV;
obtaining a desired angular velocity based on the desired attitude and the measured attitude; and
obtaining the first control parameter based on a measured angular velocity of the UAV and the desired angular velocity.

7. The method according to claim 1, further comprising:
controlling an attitude of the UAV based on a gyroscopic torque generated from the UAV rotating at the angular velocity greater than the first threshold to enter a stable mode, wherein in the stable mode, the UAV retains rotating at the angular velocity greater than the first threshold and is configured to perform an operation according to an instruction.

8. The method according to claim 7, wherein the instruction includes at least one of:
a returning instruction to instruct the UAV to return;
a hovering instruction to instruct the UAV to hover;
a landing instruction to instruct the UAV to land; or
a flight control instruction including at least one of a flight direction or a flight speed to instruct the UAV to fly according to at least one of the flight direction, or the flight speed.

9. The method according to claim 7, wherein the controlling of the attitude of the UAV based on the gyroscopic torque generated from the UAV rotating at the angular velocity greater than the first threshold to enter the stable mode includes:
changing, based on the gyroscopic torque generated from the UAV rotating at the angular velocity greater than the first threshold, at least one of a roll angle or a pitch angle of the UAV within a predetermined range to enter the stable mode.

10. The method according to claim 7, wherein the controlling of the attitude of the UAV based on the gyroscopic torque generated from the UAV rotating at the angular velocity greater than the first threshold to enter the stable mode includes:
obtaining a desired parameter including a desired angular velocity of a roll axis of the UAV and a desired angular velocity of a pitch axis of the UAV based on the gyroscopic torque generated from the UAV rotating at the angular velocity greater than the first threshold;
obtaining a third control parameter including a third control torque and a third control total lift force of the UAV succeeding the power failure of the rotor based on the desired parameter and a measured parameter; and
controlling, based on the third control parameter, the attitude of the UAV to enter the stable mode.

11. The method according to claim 10, wherein the obtaining of the desired parameter based on the gyroscopic torque generated from the UAV rotating at the angular velocity greater than the first threshold includes:
obtaining distributed torques of the UAV on the roll axis and the pitch axis;
obtaining the gyroscopic torque based on the distributed torques, a preset first distribution coefficient, and a preset second distribution coefficient; and
obtaining the desired parameter based on the gyroscopic torque and a gyroscopic torque mapping relation.

12. The method according to claim 11, wherein at least one of the first distribution coefficient or the second distribution coefficient is greater than 0 and less than or equal to 1.

13. The method according to claim 11, wherein the first distribution coefficient is equal to the second distribution coefficient.

14. The method according to claim 1, further comprising:
controlling a horizontal speed of the UAV based on a current flight state of the UAV to allow a horizontal acceleration of the UAV to be within a predetermined range.

15. The method according to claim 14, wherein the controlling of the horizontal speed of the UAV based on the current flight state of the UAV to allow the horizontal acceleration of the UAV to be within a predetermined range includes:

obtaining a desired horizontal speed of the UAV;
obtaining a measured horizontal speed of the UAV;
outputting a speed regulating signal based on the desired horizontal speed, the measured horizontal speed, and the current flight state of the UAV; and
controlling the horizontal speed of the UAV based on the speed regulating signal to allow the horizontal acceleration of the UAV to be within the predetermined range.

16. A multi-rotor unmanned aerial vehicle (UAV), comprising:
a body;
a plurality of rotors disposed on the body; and
one or more controllers disposed on the body, wherein the one or more of the controllers are configured to:
obtain power statuses of rotors of a UAV, and
control the UAV to enter a balance mode, upon determining, based on the power statuses, that a rotor of the UAV has a power failure, wherein
in the balance mode, the UAV rotates at an angular velocity greater than a first threshold, and a displacement of the UAV in a horizontal direction is less than a preset displacement amount, and to control the UAV to enter the balance mode, the one or more of the controllers are further configured to:
obtain a first control parameter of the UAV,
obtain a feedforward parameter of the UAV,
redistribute lift forces to the rotors of the UAV based on the feedforward parameter and the first control parameter, and
control, based on redistributed lift forces of the rotors, motors of the rotors of the UAV to rotate to enable the UAV to rotate at the angular velocity greater than the first threshold, and have the displacement in the horizontal direction less than the preset displacement amount.

17. The multi-rotor UAV according to claim 16, wherein the one or more controllers are further configured to:
control the UAV to rotate at an angular velocity less than a second threshold; and
control the angular velocity at which the UAV rotates to gradually increase to reach a balance-mode angular velocity to enter the balance mode.

18. The multi-rotor UAV according to claim 16, wherein
the first control parameter includes a first control torque and a first total control lift force of the UAV preceding the power failure of the rotor; and
the feedforward parameter includes a feedforward torque and a feedforward total lift force of the UAV succeeding the power failure of the rotor.

19. A control apparatus for a multi-rotor unmanned aerial vehicle (UAV), comprising:
one or more controllers, configured to:
obtain power statuses of rotors of a UAV, and
control the UAV to enter a balance mode, upon determining, based on the power statuses, that a rotor of the UAV has a power failure, wherein
in the balance mode, the UAV rotates at an angular velocity greater than a first threshold, and a displacement of the UAV in a horizontal direction is less than a preset displacement amount, and to control the UAV to enter the balance mode, the one or more of the controllers are further configured to:

obtain a first control parameter of the UAV,
obtain a feedforward parameter of the UAV,
redistribute lift forces to the rotors of the UAV based on the feedforward parameter and the first control parameter, and
control, based on redistributed lift forces of the rotors, motors of the rotors of the UAV to rotate to enable the UAV to rotate at the angular velocity greater than the first threshold, and have the displacement in the horizontal direction less than the preset displacement amount.

20. The control apparatus according to claim 19, wherein the one or more controllers are further configured to:
control the UAV to rotate at an angular velocity less than a second threshold; and
control the angular velocity at which the UAV rotates to gradually increase to reach a balance-mode angular velocity to enter the balance mode.

* * * * *